United States Patent [19]

Paterson

[11] Patent Number: 4,818,992
[45] Date of Patent: Apr. 4, 1989

[54] EXCESSIVE ALTITUDE LOSS AFTER TAKE-OFF WARNING SYSTEM FOR ROTARY WING AIRCRAFT

[75] Inventor: Noel S. Paterson, Bothell, Wash.

[73] Assignee: Sundstrand Data Control, Inc., Redmond, Wash.

[21] Appl. No.: 503,217

[22] Filed: Jun. 10, 1983

[51] Int. Cl.$^4$ ............................................. G08B 23/00
[52] U.S. Cl. ..................... 340/970; 340/946; 340/963; 364/428; 364/433; 244/17.11; 244/180; 244/182; 73/178 H; 73/178 T; 342/65
[58] Field of Search .......... 340/27 AT, 27 R, 55 NA, 340/963, 970, 946; 73/178 R, 178 T, 178 H; 244/17.11, 180, 182; 343/7 TA; 364/427, 428, 433; 342/65

[56] References Cited

U.S. PATENT DOCUMENTS

| | | |
|---|---|---|
| 3,946,358 | 3/1976 | Bateman ........................ 340/27 R |
| 3,947,808 | 3/1976 | Bateman ........................ 340/27 AT |
| 3,947,810 | 3/1976 | Bateman ........................ 340/27 AT |
| 4,030,065 | 6/1977 | Bateman ........................ 340/27 AT |
| 4,293,840 | 10/1981 | Hadari ................................ 364/433 |
| 4,319,218 | 3/1982 | Bateman ........................... 73/178 T |

Primary Examiner—John W. Caldwell, Sr.
Assistant Examiner—Tyrone Queen
Attorney, Agent, or Firm—Mason, Kolehmainen, Rathburn & Wyss

[57] ABSTRACT

A warning system for rotary wing aircraft compares the accumulated altitude loss after take-off of the aircraft with its altitude above ground, and generates a warning if the altitude loss is excessive for the altitude above ground at which the aircraft is flying. The position of the landing gear, the speed of the aircraft and its altitude enable the system only during the take-off and missed approach phases of operation in order to minimize nuisance warnings during other phases. The relationship between radio altitude and altitude loss required to generate a warning is optimized for rotary wing aircraft such as helicopters.

9 Claims, 1 Drawing Sheet

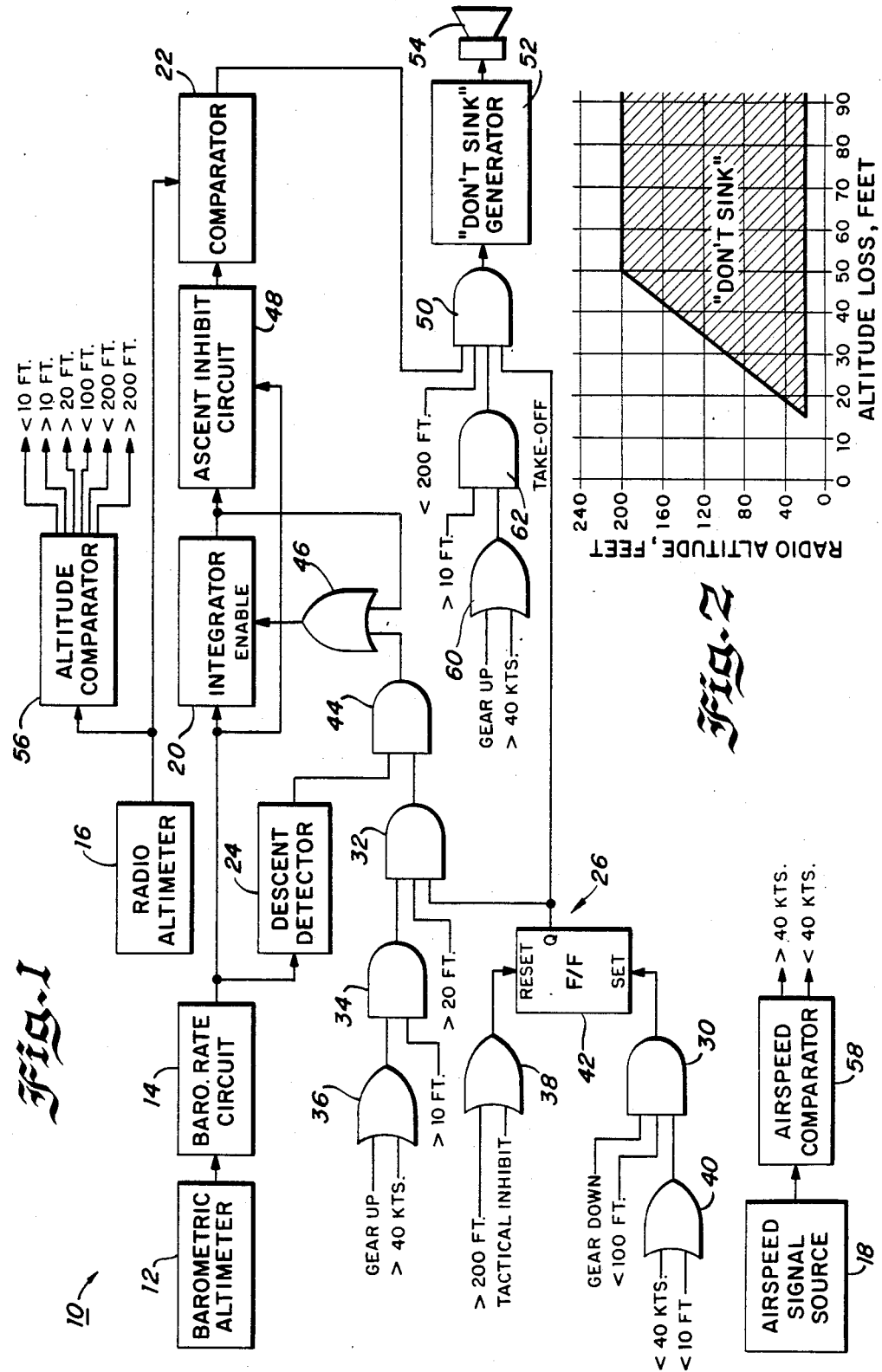

4,818,992

EXCESSIVE ALTITUDE LOSS AFTER TAKE-OFF WARNING SYSTEM FOR ROTARY WING AIRCRAFT

BACKGROUND OF THE INVENTION

1. Field of the Invention

This invention relates to the field of ground proximity warning systems, particularly to systems that warn of excessive aircraft altitude loss after take-off or during a go-around after a missed approach, and more particularly to systems optimized for rotary wing aircraft such as helicopters.

2. Description of the Prior Art

Ground proximity warning systems that warn of aircraft descent after take-off or during a go-around after a missed approach are known. Examples of such systems are disclosed in U.S. Pat. Nos. 3,946,358; 3,947,808; 3,947,810 and 4,319,218 assigned to the assignee of the present invention. The systems disclosed in the '358 and '808 patents provide a warning if the descent rate of the aircraft exceeds a predetermined rate below a given altitude, and the systems disclosed in the '810 and '218 patents generate a warning if the altitude loss exceeds a predetermined value before a predetermined altitude is reached.

While these systems do provide a way to warn the pilot of an aircraft of a hazardous condition resulting from an excessive sink rate or from an excessive altitude loss during the take-off or missed approach phase of operation, these systems are designed for use in transport aircraft, and not for use in highly maneuverable rotary wing aircraft such as helicopters whose flight and operational characteristics are entirely different than those of transport aircraft. Consequently, the systems designed for transport aircraft can generate nuisance warnings during certain normal operational conditions of a rotary wing aircraft, and provide no warning or an inadequate warning during other flight conditions.

SUMMARY OF THE INVENTION

Accordingly, it is an object of the present invention to provide an excessive altitude loss after take-off warning system that is particularly suitable for use in rotary wing aircraft such as helicopters.

It is another object of the present invention to provide an excessive altitude loss warning system suitable for use in rotary wing aircraft that has the warning envelope tailored to meet the operational and performance characteristics of such aircraft.

It is yet another object of the present invention to provide an excessive altitude loss warning system for rotary wing aircraft, such as helicopters, that has enabling and disabling logic that enables the warning function as a function of altitude, airspeed and landing gear position during take-off and missed approach phases of flight, and disables the warning function during other phases of flight to minimize nuisance warnings.

The operational and flight characteristics of rotary wing aircraft are considerably different than those of transport aircraft. For example, while a transport aircraft tends to climb steadily after a take-off, a rotary wing aircraft such as a helicopter may, under certain conditions, continue to fly at low levels after take-off. Such low level flight after take-off is hazardous because if the pilot becomes distracted or disoriented, he may inadvertently allow the aircraft to descend into the ground. Such disorientation is particularly likely because rotary wing aircraft are commonly used at night over water, or in jungle or wilderness areas where the pilot may lose visual reference and allow the aircraft to descend into the ground or water. Consequently, it is desirable to provide the pilot with a specific voice warning, such as, for example, "DON'T SINK", in order to alert the pilot of an impending impact into the ground within sufficient time to permit him to take corrective action. However, the warning should only be given when an actual ground impact is imminent, and not during other phases of flight where large altitude losses are intentionally produced, such as during the landing phases of flight and during certain tactical maneuvers.

Briefly, the system according to the invention becomes active at an altitude of approximately 20 feet, or virtually as soon as the aircraft is off the ground and the signals from the various instruments are valid, and remains active as long as the aircraft remains below 200 feet of altitude above the ground. Because of the rapid recovery characteristics of rotary wing aircraft, the system permits relatively high altitude losses to occur before a warning is generated, thereby to minimize nuisance warnings. For example, the system according to the invention will permit an altitude loss of up to 15 feet when the aircraft is flying at 20 feet of altitude above ground before generating a warning, and permit an altitude loss of 50 feet when the aircraft is flying at 200 feet. Above 200 feet above ground no warning is generated. A specific voice warning such, "DON'T SINK", is generated to indicate unambiguously that the aircraft has descended excessively.

In order further to prevent false or nuisance warnings during phases of flight other than the take-off or go-around phases, logic circuitry is provided to enable the system only during the take-off and go-around phases. This circuitry monitors the airspeed of the aircraft, the position of the landing gear and the altitude of the aircraft in order to determine whether the aircraft is actually in a take-off phase or in a go-around after a missed approach phase. Once it has been established that the aircraft is indeed in a take-off or a go-around after a missed approach phase, the system monitors the radio altitude and the altitude loss obtained by integrating the barometric altitude rate, and issues a voice warning, such as, "DON'T SINK", when an excessive descent is encountered.

DESCRIPTION OF THE DRAWING

These and other objects and advantages of the present invention will become readily apparent upon consideration of the following detailed description and attached drawing wherein:

FIG. 1 is a functional block diagram of one implementation of the warning system according to the invention; and FIG. 2 is a graph illustrating the relationship between radio altitude and altitude loss that the aircraft must attain to generate a warning.

DETAILED DESCRIPTION OF THE PREFERRED EMBODIMENT

A system according to the invention capable of providing the warning described above without generating excessive nuisance warnings is illustrated in FIG. 1, and designated generally by the reference numeral 10. The system 10 according to the invention is illustrated in FIG. 1 in functional or logical block diagram form as a series of gates, comparators, flip-flops and the like for purposes of illustration; however, it should be understood that the actual implementation of the logic can be other than as shown in FIG. 1, with various digital and analog implementations being possible. The signals used by the warning system as described include radio altitude, barometric altitude, barometric altitude rate, airspeed, a signal representative of the position of the aircraft landing gear, a signal indicating whether the aircraft is in a tactical or non-tactical phase of flight, and various validity signals. Depending on the type of aircraft in which the warning system is installed, the signal shown in FIG. 1 can be obtained from individual instruments such as a barometric altimeter 12, a barometric altitude rate circuit 14, a radio altimeter 16, an airspeed signal source 18, which may be an air data computer or an airspeed indicator, and from discrete elements indicating whether the aircraft is in a tactical or non-tactical phase of flight, and whether the landing gear is up or down. Alternatively, the signals may be received from a digital data bus in certain newer aircraft.

In order to determine whether or not the aircraft has lost an excessive amount of altitude for the altitude at which it is flying, the barometric rate signal is integrated by an integrator 20 and applied to a comparator 22 when the aircraft is descending. The barometric rate signal may be obtained from the barometric rate circuit which differentiates the signals from the barometric altimeter 12, or from another suitable source. The function of the integrator 20 is to integrate the signal from the barometric rate circuit 14 to provide a signal representative of the altitude loss of the aircraft after take-off. Thus, the integrator 20 is enabled only when a descent condition has been detected by a descent detector 24, and when a take-off or a go-around condition is indicated by take-off logic circuitry 26 which includes AND gates 30, 32 and 34, OR gates 36, 38 and 40, and a set-reset flip-flop 42. Thus, if a take-off or go-around after a missed approach condition is indicated, and a descent is detected by the descent detector 24, an AND gate 44 is enabled and applies an enabling signal to the integrator 20 via an OR gate 46. The integrator 20 then integrates the barometric rate signal from the barometric rate circuit 14 to generate an altitude loss signal. The altitude loss signal is applied to the comparator 22 via an ascent inhibit circuit 48, whose function will be described in a subsequent portion of the specification. The comparator 22 generates a warning initiation signal when the altitude loss is excessive for the altitude at which the aircraft is flying, and applies it to an AND gate 50. Assuming that all of the other inputs to the AND gate 50 are enabled, the AND gate 50 applies the warning initiation signal to a voice warning generator 52, which may be a digital voice generator. The warning initiation signal causes the voice generator 52 to apply a voice message, such as, for example, "DON'T SINK", to a transducer such as an earphone or a loudspeaker 54 to inform the pilot of the specific hazardous flight condition being warned against. Although the output of the voice generator 52 is shown connected directly to the transducer 54, the voice generator may be connected either directly or indirectly to the transducer 54, preferably indirectly through the intercom system of the aircraft.

As previously stated, the warning can be generated only when the aircraft is in a take-off or a go-around after a missed approach mode, and when the aircraft is between 20 and 200 feet above the ground. In the present embodiment, a take-off condition is defined as being present when the landing gear of the aircraft is down, the aircraft is below 100 feet of radio altitude, and the airspeed of the aircraft is less than 40 knots or the radio altitude is less than 10 feet. Thus, the take-off mode is indicated by the AND gate 30 which sets the flip-flop 42 when the gear is down, the altitude is below 100 feet and the airspeed is less than 40 knots or the aircraft is below 10 feet above the ground. Signals representative of the above conditions are received from a gear position discrete, the OR gate 40, an altitude comparator 56 and an airspeed comparator 58.

The altitude comparator 56 compares the radio altitude signal from the radio altimeter 16 with various reference signals representative of various altitudes (which may be internally generated, as shown in FIG. 1, or externally generated), and provides several output signals when the various discrete altitudes are reached. These discrete altitude representative signals are applied to various gates and logic elements in order to enable or disable various functions when the various altitudes are reached. In the present embodiment, the altitude comparator provides a less than 10 feet signal, a greater than 10 feet signal, a greater than 20 feet signal, a less than 100 feet signal, a greater than 100 feet signal and a greater than 200 feet signal to the various logic components. Similarly, the airspeed comparator 58 compares the signal from the airspeed signal source 18 with a reference signal representative of an airspeed of 40 knots, and provides a greater than 40 knots and a less than 40 knots signal to various logic components.

In operation, as the aircraft takes off, the landing gear is down, the altitude of the aircraft is below 100 feet and the speed of the aircraft is less than 40 knots. This enables the AND gate 30, and sets the flip-flop 42 to indicate a take-off mode, thereby applying enabling signals to the AND gates 32 and 50. The aircraft gains altitude and airspeed until the altitude of the aircraft above ground is greater than 20 feet and the speed of the aircraft exceeds 40 knots or the gear is raised. Under these conditions, the AND gate 32 is fully enabled by signals from the altitude and airspeed comparators 56 and 58, and by the gates 34 and 36. This enables the AND gate 44, and places it under the control of the descent detector 24.

As long as the aircraft continues to ascend, the descent detector 24 maintains the AND gate 44 and the ascent inhibit circuit 48 in an inhibited condition. However, if the aircraft descends, the descent detector detects a signal representative of a descent rate from the barometric rate circuit 14, and enables the AND gate 44 and the ascent inhibit circuit 48. Under these conditions, the integrator 20 integrates the barometric rate signal from the barometric rate circuit 14 to provide a signal representative of cumulative altitude loss to the comparator 22 via the ascent inhibit circuit 48. The comparator 22 compares the cumulative altitude loss with the radio altitude, and generates a warning initiation signal if the altitude loss exceeds a predetermined amount as determined by the radio altitude at which the aircraft is flying. The warning initiation signal is applied to the AND gate 50, and if the landing gear is up or the speed of the aircraft is in excess of 40 knots, and if the aircraft is flying between the altitudes of 10 feet and 200 feet, as determined by the signal applied to the OR gate 60 and the AND gates 50 and 62, the warning will be generated.

The "DON'T SINK" warning will be repeated by the voice generator until the pilot takes corrective action to terminate the descent. Once this occurs, the barometric rate circuit 14 will provide a signal representative of an ascent condition, thereby inhibiting the ascent inhibit circuit 48 and the AND gate 44. The inhibiting of the ascent inhibit circuit 48 will cause the warning to be terminated; however, the integration of the barometric rate signal by the integrator 20 will not be terminated. The integrator 20 will be maintained in an enabled condition by the OR gate 46 which receives an enabling signal from the integrator 20 as long as there is a signal representative of a cumulative altitude loss present at the output of the integrator 20.

As the aircraft continues to ascend, the integrator 20 integrates the positive barometric rate signal from the barometric rate circuit 14 to thereby reduce the magnitude of the altitude loss signal present at the output of the integrator 20. If the aircraft begins to descend again, the integrator 20 adds any altitude loss to the altitude loss signal previously accumulated, and causes the comparator 22 to generate the warning initiation signal when the cumulative loss exceeds the maximum loss permitted for the altitude at which the aircraft is flying.

As the aircraft continues to ascend, and its altitude above ground exceeds 200 feet, the AND gate 50 is disabled by the termination of the less than 200 feet signal. This action prevents the generation of the warning above 200 feet of radio altitude. Simultaneously, the greater than 200 feet signal is applied to the OR gate 38 which resets the flip-flop 42, thereby disabling the gates 32 and 44 in order to terminate the operation of the integrator 20.

As the aircraft completes its mission and is on its approach to a landing, the aircraft will lower its landing gear and eventually drop below 100 feet, and if its airspeed drops below 40 knots or its altitude drops below 10 feet, the gate 30 will set the flip-flop 42 to thereby enable the gates 32 and 50. Consequently, in the event of a missed approach, if the pilot raises his gear or exceeds 40 knots and climbs above 10 feet of radio altitude, the gate 32 will again be enabled by the gates 34 and 36. This enables the warning generating system, and permits a warning to be generated in the event of an excessive altitude loss during the go-around.

The sink rate versus altitude loss criteria necessary to provide a warning are illustrated in the graph of FIG. 2. As illustrated by the shaded area of the graph of FIG. 2, the system is enabled only when the radio altitude of the aircraft is between 20 and 200 feet. Although enabling the system in this range of altitudes may be accomplished in a variety of ways, in the embodiment illustrated in FIG. 1, the enabling is accomplished by the less than 200 feet signal applied to the AND gate 50 and by the greater than 20 feet signal applied to the AND gate 32. The diagonal line between the 20 feet and 200 feet altitudes has been selected to suit the operational characteristics of a typical rotary wing aircraft such as a helicopter. The envelope has been chosen so that an altitude loss of only 15 feet is sufficient to generate a warning at an altitude above ground of 20 feet, but a 50 feet loss of altitude is permitted at an altitude above ground of 200 feet before a warning is generated. This curve can be expressed by the following equation:

$$H\ WAR = -57.4 + 5.143\ HB\ LOSS$$

wherein H WARN is the altitude at which the warning is generated and HB LOSS is the barometric altitude loss.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for providing a warning of a hazardous flight condition of a rotary wing aircraft during a take-off or a go-around after a missed approach phase of flight, comprising:

means for providing a signal representative of the altitude of the aircraft above ground and the descent rate of the aircraft;

means responsive to the signal provided by said descent rate signal providing means for generating a signal representative of altitude loss of the aircraft; and means responsive to the altitude above ground signal providing means and said altitude loss signal providing means for detecting an excessive altitude loss and providing a warning indicative of excessive altitude loss when the aircraft is flying between approximately 20 and 200 feet of altitude above the ground and when the altitude loss exceeds approximately 15 feet at approximately 20 feet of altitude above the ground and approximately 50 feet at approximately 200 feet of altitude above the ground, wherein said altitude and descent rate signal providing means includes a radio altimeter, a barometric altimeter and a barometric rate circuit, wherein said altitude loss signal providing means includes an integrator that is responsive to the barometric rate circuit to provide the altitude loss representative signal, said warning system further including means for enabling the generation of a warning only when the aircraft is in a take-off or a go-around after a missed approach phase of flight, wherein the aircraft has landing gear movable between a down position and a retracted position, wherein said system includes means for providing a signal representative of the position of the landing gear, means for providing a signal representative of the airspeed of the aircraft, and wherein said enabling means includes means responsive to the landing gear position signal providing means, to the airspeed signal providing means and to the altitude signal providing means for generating a take-off mode enabling signal for enabling said warning system only when the landing gear is down, and the aircraft is below approximately 100 feet and either the airspeed of the aircraft is less than approximately 40 knots or the aircraft is below approximately 10 feet above the ground.

2. A warning system as recited in claim 1 further including second means for enabling said altitude loss signal providing means, wherein said second enabling means includes means responsive to the descent rate signal providing means, the gear position signal providing means, the airspeed signal providing means, the altitude signal providing means and the take-off signal providing means for enabling said altitude loss signal providing means only when the landing gear is up or the aircraft is flying in excess of approximately 40 knots and the aircraft is descending, and the altitude above ground exceeds approximately 10 feet, and the take-off mode signal is present.

3. A warning system for providing a warning of a hazardous flight condition of a rotary wing aircraft during a take-off or a go-around after a missed approach phase of flight, wherein the aircraft has a landing gear that is movable between a retracted position and a down position, said system comprising:

means for providing a signal representative of the altitude of the aircraft above ground, the descent rate of the aircraft and the airspeed of the aircraft;

means responsive to the signal provided by said descent rate signal providing means for generating a signal representative of the altitude loss of the aircraft;

means for providing a signal representative of the position of the landing gear of the aircraft;

means responsive to said altitude above ground signal providing means and said altitude loss signal providing means for detecting an excessive altitude loss and providing a warning indicative of an excessive altitude loss when the altitude loss is excessive for the altitude at which the aircraft is flying;

means responsive to said altitude signal providing means, said airspeed signal providing means, and said gear position signal providing means for enabling said warning means only when the airspeed of the aircraft is less than approximately 40 knots or the altitude above ground of the aircraft is less than approximately 10 feet, and the landing gear is down, and the altitude of the aircraft is less than approximately 100 feet above the ground, said enabling means being operative to generate a take-off mode signal when the above conditions have been met; and means responsive to said take-off mode signal providing means and to said descent rate signal providing means, said altitude signal providing means, said airspeed signal providing means and said landing gear position signal providing means for enabling said altitude loss signal providing means only when the landing gear is up or the airspeed is greater than approximately 40 knots and the altitude is greater than approximately 20 feet above the ground and the aircraft is in a take-off mode.

4. A warning system as recited in claim 3 wherein said warning signal providing means includes means for detecting an excessive altitude loss when the aircraft is flying between approximately 20 and 200 feet of altitude above ground when the altitude loss exceeds approximately 15 feet at approximately 20 feet of altitude above the ground and approximately 50 feet at approximately 200 feet above the ground, wherein the altitude loss required to generate a warning increases linearly between 20 feet of altitude above the ground and 200 feet of altitude above the ground.

5. A warning as recited in claim 3 wherein said warning means includes means for generating a voice warning.

6. A warning system for providing a warning of a hazardous flight condition of a rotary wing aircraft during a take-off or a go-around after a missed approach phase of flight, comprising:

means for providing a signal representative of the altitude above ground of the aircraft;

means for providing a signal representative of the altitude loss of the aircraft;

means responsive to the altitude above ground signal providing means and to said altitude loss signal providing means for detecting an excessive altitude loss and for providing a warning if the altitude loss exceeds a predetermined value determined by the altitude above ground at which the aircraft is flying;

means for providing a signal representative of the air speed of the aircraft; and means responsive to said airspeed signal providing means for enabling said warning means to generate said warning if the airspeed of the aircraft is below a predetermined airspeed.

7. A warning system as recited in claim 6 wherein said predetermined airspeed is approximately 40 knots.

8. A warning system as recited in claim 6 wherein the enabling means further includes means responsive to a signal representative of the position of the landing gear of the aircraft for enabling said warning means to generate said warning if the landing gear is down.

9. A warning system as recited in claim 6 wherein said enabling means further includes means responsive to a signal representative of the altitude of the aircraft for enabling said warning means to generate said warning if the altitude of the aircraft is below approximately feet above the ground.

* * * * *